United States Patent
Charbonneau (10) Patent No.: US 7,506,171 B2
(45) Date of Patent: *Mar. 17, 2009

(54) METHOD AND SYSTEMS FOR SECURELY SUPPORTING PASSWORD CHANGE

(75) Inventor: Marc Charbonneau, Casseiman (CA)

(73) Assignee: Activcard Ireland Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 11/754,876

(22) Filed: May 29, 2007

(65) Prior Publication Data

US 2007/0226791 A1 Sep. 27, 2007

Related U.S. Application Data

(63) Continuation of application No. 09/977,202, filed on Oct. 16, 2001, now Pat. No. 7,249,261.

(51) Int. Cl.
*H04L 9/00* (2006.01)
(52) U.S. Cl. ....................... 713/184; 713/186
(58) Field of Classification Search .................. None
See application file for complete search history.

(56) References Cited

U.S. PATENT DOCUMENTS

| 5,611,048 | A  | 3/1997  | Jacobs et al. ............... 713/202 |
| 5,778,065 | A  | 7/1998  | Hauser et al. .............. 713/155 |
| 5,889,516 | A  | 3/1999  | Hickey et al. .............. 715/740 |
| 5,944,825 | A  | 8/1999  | Bellemore et al. .......... 703/202 |
| 6,636,973 | B1 | 10/2003 | Novoa et al. ............... 713/202 |
| 6,732,973 | B1 | 5/2004  | Rehkemper ................ 713/201 |
| 6,826,686 | B1 | 11/2004 | Peyravian et al. .......... 713/168 |

FOREIGN PATENT DOCUMENTS

WO       WO 01/60013       8/2001

*Primary Examiner*—Pramila Parthasarathy
(74) *Attorney, Agent, or Firm*—Perkins Coie LLP (57) ABSTRACT

A system and method of securely supporting password change is disclosed. The method performed by the system includes the steps of detecting an occurrence of a password change operation in execution on a system and receiving a new password by the system; detecting the new password when provided; storing data indicative of the new password in a database independent of the password database of the system for later retrieval; and providing the data indicative of the new password from the independent database to the password database.

20 Claims, 8 Drawing Sheets

Fig. 1  Prior Art

Password window

Log in ID [                    ]

Password [                    ]

Fig. 2    Prior Art

Password window

Log in ID [ SMITH              ]

Password [ *******             ]

METHOD AND SYSTEMS FOR SECURELY SUPPORTING PASSWORD CHANGE

CROSS REFERENCE TO RELATED APPLICATION

This application is a Continuation of U.S. application Ser. No. 09/977,202 filed Oct. 16, 2001.

FIELD OF THE INVENTION

The present invention relates to a method for changing password data, and more particularly, to a method for securely supporting password change for a central database of passwords independent of some processes with which the password is associated.

BACKGROUND OF THE INVENTION

Security is fast becoming an important issue. It is well known that with the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been preset.

In many large companies, the computer system is organized as a network to reduce the cost of purchasing and installing software on all the stations existing in the company. A main advantage of using a network is to facilitate data accessibility to each employee. However, it is necessary to limit access of a company's network to the company's employees. As such, prior to access to the company's network, a password window prompted the company's employees to enter a login identity and an associated password. Usually, a user specifies passwords. Most users, being unsophisticated users of security systems, classically choose as the login identity their first name and their dog's name as a password for example. Each time a user is prompted to enter his password, the password is always identical to the one previously entered by the user unless the user has modified his password during a previous session. As such, many password systems are easily accessed through a simple trial and error process.

Optionally, to make the system more difficult to break, the network system is organized in such a way that regularly all the employees are prompted to change their password, or are required to run a specific routine to change their password. Often, the system allows the users to combine a non-determined number of letters, either small or capital, and digits in their passwords. During the time period lasting between two successive modifications of a password, the password remains unchanged. A competent person may rapidly find out the password of a user and access a company's network.

Optionally, a password is stored in a password database and user authorization information such as biometric information, a digital key, a smart card, or a global password is required to retrieve the password. When the password is retrieved, it is provided to the password window. It is known to those skilled in the art that a biometric identification system accepts unique biometric information from a user and identifies the user by matching the information against information belonging to registered users of the system. Fingerprint sensing and matching is a reliable technique for personal identification and/or verification.

The combination of a password and biometric information such as a fingerprint for example is beneficial because it increases the security and limits accessibility to a system. However, an association between a biometric information sample and a password also raises a problem when the password is changed. If an individual changes his password manually using, for example, a change password command of a password protected system, a next time he wants to access the system and provides his fingerprint, his old password is retrieved and provided to the password prompt. The old password is not current and therefore a message indicating that the password is incorrect is provided for the user. Thus, the user has to manually type in the new password. Eventually, the user can run a password change routine wherein the old password is provided along with the fingerprint, the new password typed in and the biometric sample assigned from then to the new password.

OBJECT OF THE INVENTION

To overcome such an inconvenience, it is an object of this invention to provide a method for automatically assigning a new password.

It is another object of the present invention to provide a method of detecting a password change operation in a system and prompt for a new password.

It is another object of the present invention to provide a method of detecting a password change command and authorizing a password change operation.

SUMMARY OF THE INVENTION

In accordance with a preferred embodiment of the present invention, there is provided a method of securely supporting password change comprising the steps of: detecting an occurrence of a change of password operation in execution on a system and for receiving a new password by the system; detecting the new password when provided; storing data indicative of the new password in a database other than the password database of the system for later retrieval, the data indicative of the new password for provision to the system.

In accordance with another preferred embodiment of the present invention, there is provided a method of securely supporting password change comprising the steps of: detecting a change password operation in execution on a system; displaying to a user a prompt for a new password, the prompt independent of the password change operation; receiving the new password; performing an operation to change the password to the new password in the system; and, storing the new password in a database independent of the change password operation and of the database where the changed password is stored by the change password operation.

In accordance with another preferred embodiment of the present invention, there is provided a method of securely supporting password change comprising the steps of: detecting a password change operation in execution on a system; displaying to a user a prompt for authentication information, the prompt independent of the password change operation; receiving the authentication information; when the authentication information is indicative of a user, providing a password associated with the user to the system; performing an operation to change the password to a new password in the system; and, storing the new password in a database independent of the change password operation and of the database where the changed password is stored.

BRIEF DESCRIPTION OF THE DRAWINGS

Exemplary embodiments of the invention will now be described in conjunction with the following drawings, in which.

DETAILED DESCRIPTION OF ILLUSTRATIVE EMBODIMENTS

Figure 1:
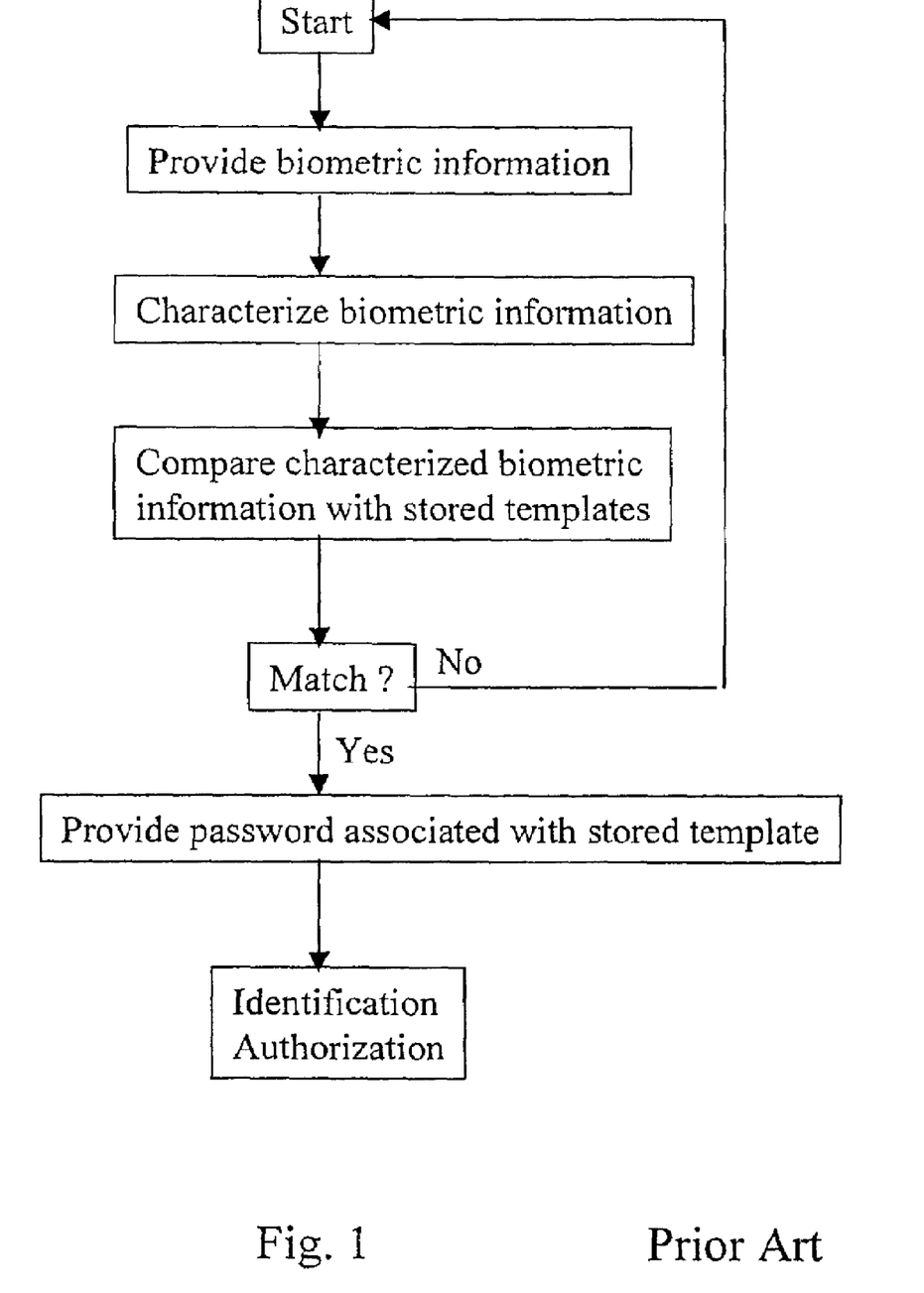
FIG. 1 is a flow diagram of a prior art method of associating a password to a fingerprint upon a match of a fingerprint with an associated template.

In the prior art, many security systems involving imaging fingerprints to allow access for example to a building, to a specific area within a building, to a computer, are described. The security systems wherein biometric information is used for identifying and authorizing access to an individual mostly rely on a prior art method as shown in FIG. 1. After a biometric information sample, in a form of a fingerprint for example, has been provided to a system, in order to generate a fingerprint, a fingertip is imaged to generate an image thereof, which is called a fingerprint or a fingerprint image. The fingerprint is then characterized. During the process of identification, the characterized fingerprint is compared to stored templates associated with fingerprints of the person—for a one-to-one identification system—or of any person registered for access the system—in a one-to-many identification system. Upon a positive result of the comparison, when there is a match between the provided fingerprint and a stored template associated with a fingerprint, the system provides a password associated with the stored template to, for example, a legacy password based system and the user is identified and authorized.

Figure 2:
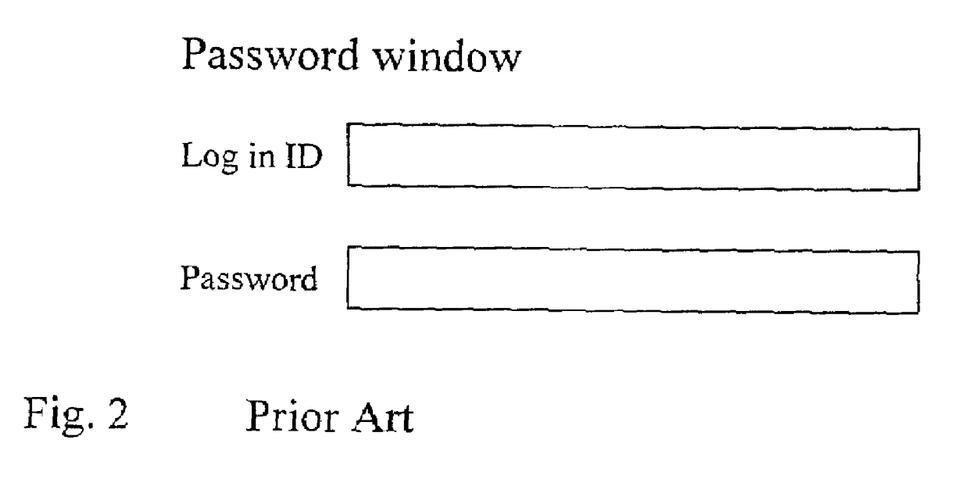
FIG. 2 is an example of a prior art password window dialog display.
Figure 2A:
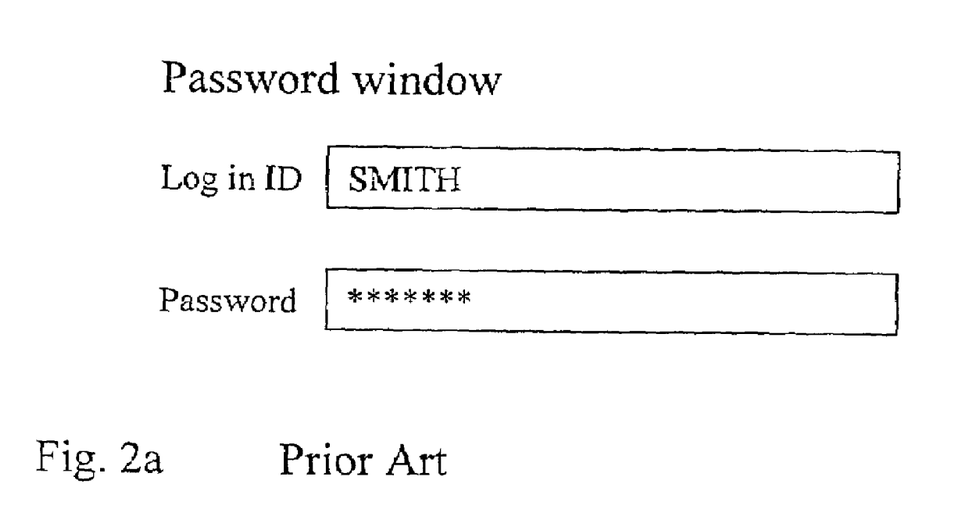
FIG. 2a is an example of a filled password window dialog box on a computer screen display.

FIG. 2 illustrates an example of a screen display prompting an employee to enter a login identity and an associated password to allow the employee to access the network. An example of the display of FIG. 2 filled in is shown in FIG. 2a. Classically, the login identity is the user's name, illustrated here, as "Smith". For security purpose, each character of the password is replaced with a star on the display so that nobody can read it. Each time a user is prompted to enter his password, the password is always identical to the one previously entered by the user unless the user has changed his password during a previous session.

Figure 3:
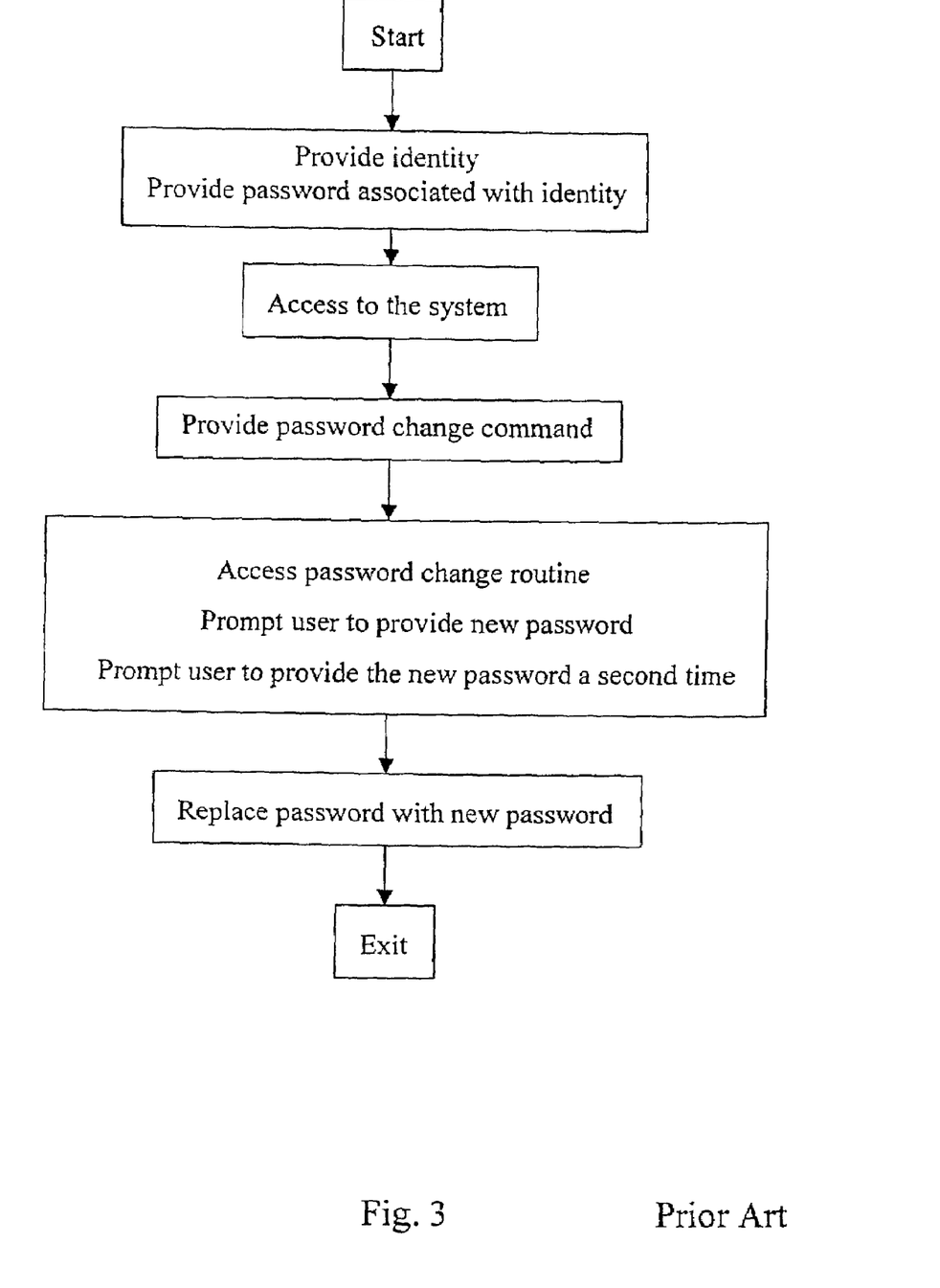
FIG. 3 is a flow diagram of a prior art method of changing a password.

Optionally, to make the system more difficult to break, the network system is organized in such a way that, regularly, all the employees are prompted to enter a new password in order to change the passwords at regular intervals. Often, the system allows the users to combine a non-predetermined number of letters, either small or capital, and digits in their passwords. Referring to FIG. 3, a prior art method of changing passwords is shown. In order to access a system, the password change window prompts a user to provide an identity and the old password associated with the provided identity. Once authorized, the user is able to provide the system with a new password. Typically, the user is prompted to type in a new password two times. The new password is stored in a password database of an application or operating system related to the password change operation on the system and now replaces the old password.

Figure 4:
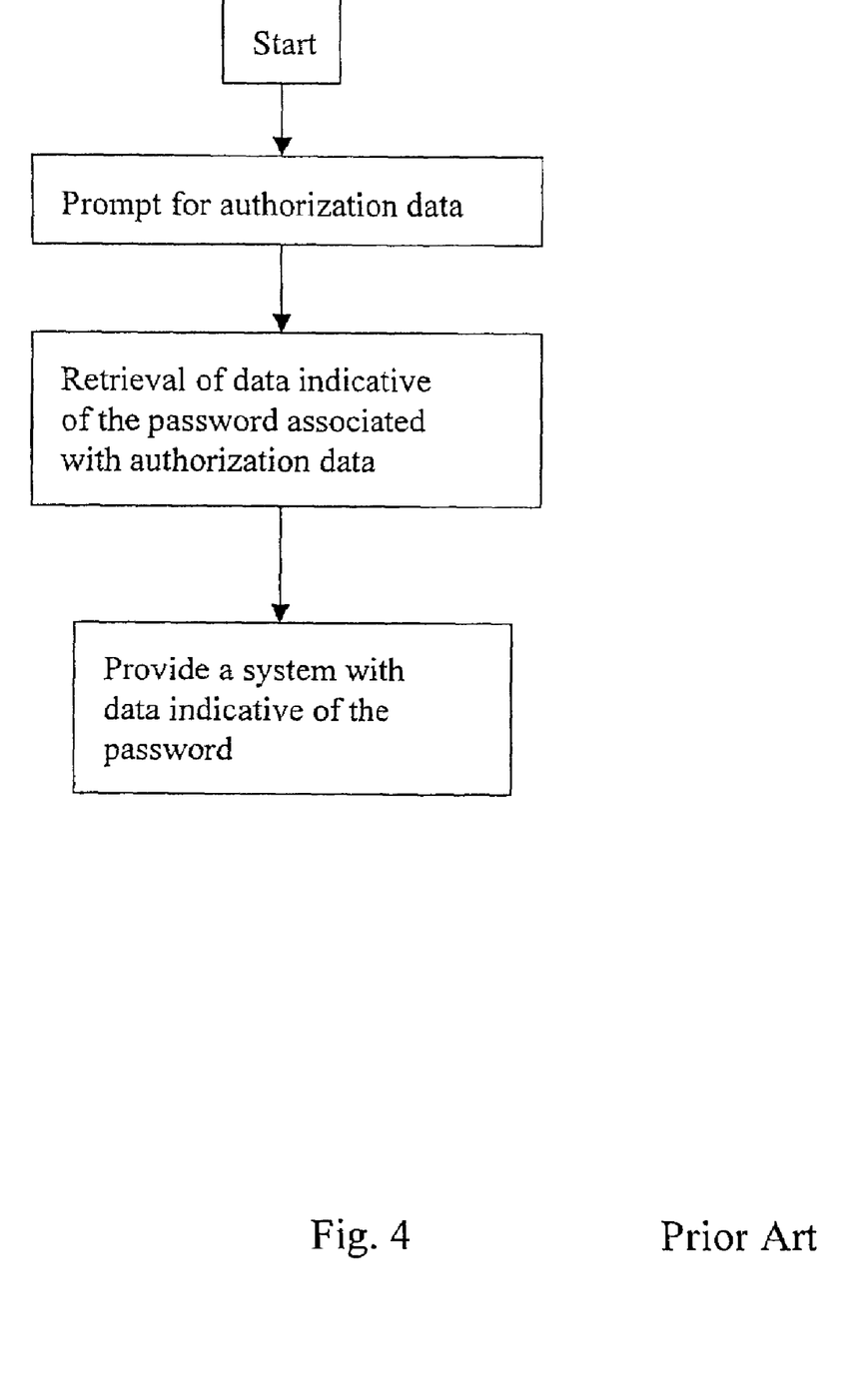
FIG. 4 is a flow diagram of a prior art method of Retrieving the password for provision to the system.

Referring now to FIG. 4, a flow diagram of a method of retrieving the password for provision to the system is shown. For accessing a system, a user provides authorization data, in the form of biometric information sample or information stored on a smart card. The authorization data is verified and is used to retrieve data indicative of the user password. Upon provision of the authorization data, the password is retrieved from a database other than the password database of the system or application and provided to the system or application so that the user can gain access thereto.

The authorization data permits identifying a user based on, for example, biometric information provided therefrom. This provides an indication that the correct person was actually present when the request for changing a password was provided. A major advantage of using biometric information for retrieving a password is that the password does not have to be memorized. Typically, the user provides biometric information from a biometric source. The biometric information is characterized, processed and compared against templates stored in the system. Upon a match of the features extracted from the templates and the characterized biometric information corresponding to the biometric source provided by the user, an authorization signal is either provided or denied.

Figure 5:
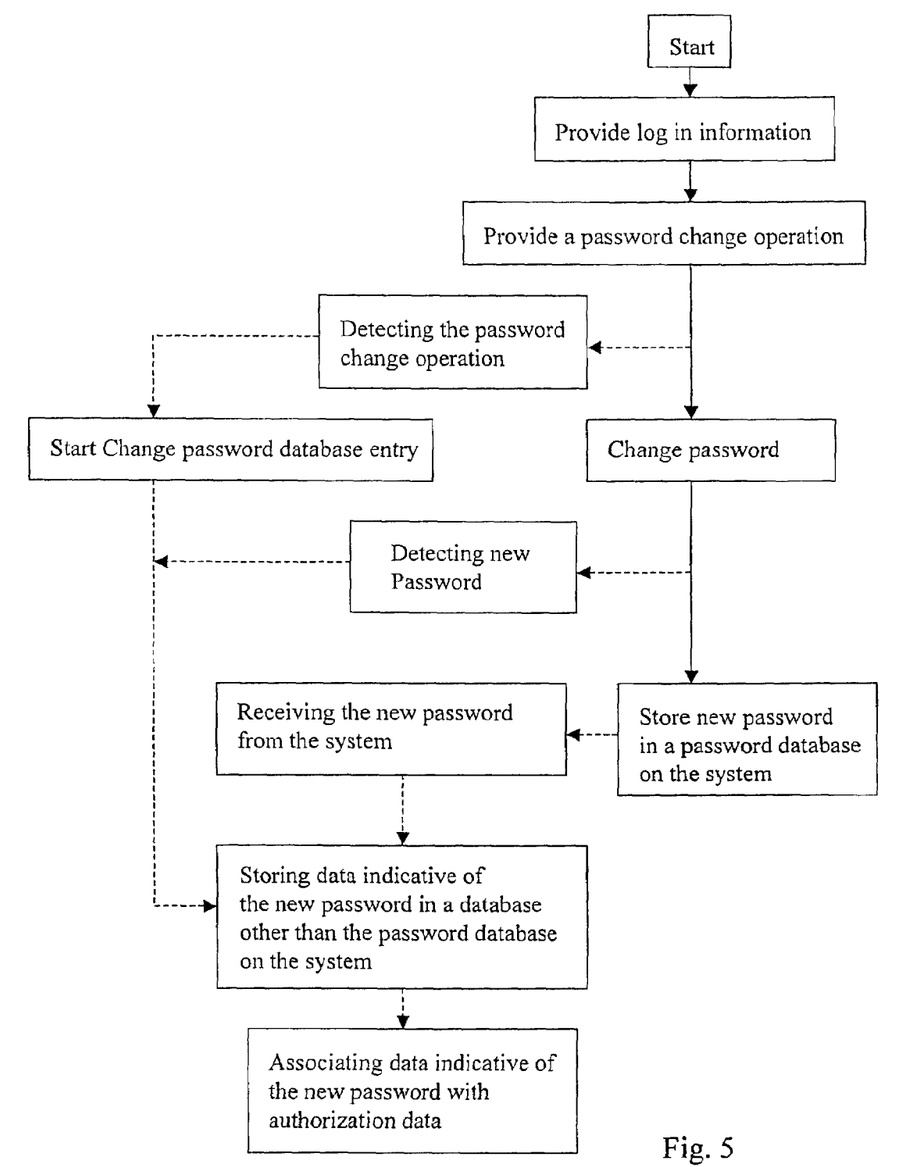
FIG. 5 is a flow diagram of a method of securely supporting password change in accordance with a preferred embodiment of the present invention.

Referring now to FIG. 5, a method for securely supporting password change in accordance with a preferred embodiment is shown. To facilitate the comprehension of the figure, lines are plain for showing a classic password change routine flow, whereas dashed lines show changes in process flow for securely supporting password change. Each individual also has access from its workstation to a password change command. It is understandable that when a user has any doubt concerning the confidentiality of his password, he can change it independently of a network administrator. The user accesses the system and provides a command for a password change operation to be performed on the system. Usually, the user is prompted to type in a new password twice as disclosed with reference to FIG. 3, and then the new password is stored in a password database on the system. Inconveniently, the password is changed independently of the authorization data or log in information when the system supports user authorization and password retrieval as disclosed with reference to FIG. 4. Therefore, the next time the user tries to access the system, his password information will not match with the new password—it has not been updated, and access will be denied.

According to the present invention, when a change password operation in execution on the system occurs, it is detected. That said, any password change command options in the form for example of the word "password" or the abbreviation "pwd" typed in are recognized. Of course, though it is preferred that all possible password change operations are detected, the present invention is advantageous if even a single change password operation is detected. The new password is changed and data indicative of the new password is stored in the password database on the system. Approximately simultaneously, the new password is detected by another process that uses the detected data to change the password in another database. For example, the data indicative of the new password is automatically associated with the authorization data within a system such as that of FIG. 4. Therefore, for future accesses to the system, the user just provides his authorization data in a form of a fingerprint for example, the system retrieves the data indicative of the new password associated with the authorization data and the user is authorized to access the system.

Alternatively, the storage of the new password in a password database on the system is detected and data indicative of the new password are also detected for storing in a database other than the password database on the system.

Interestingly, the user is not aware of the detection procedure and of the automatic assignment of the authorization data to the data indicative of the new password. Therefore, the user types in a new password twice for storing the new password in a password database on the system, data indicative of the new password is saved in a database other than the password database on the system and the password is changed on the system, and the user does not have to retype this new password for further access. However, because of the transparency of such a system, the user does not know whether his new password has effectively been changed or not.

Figure 6:
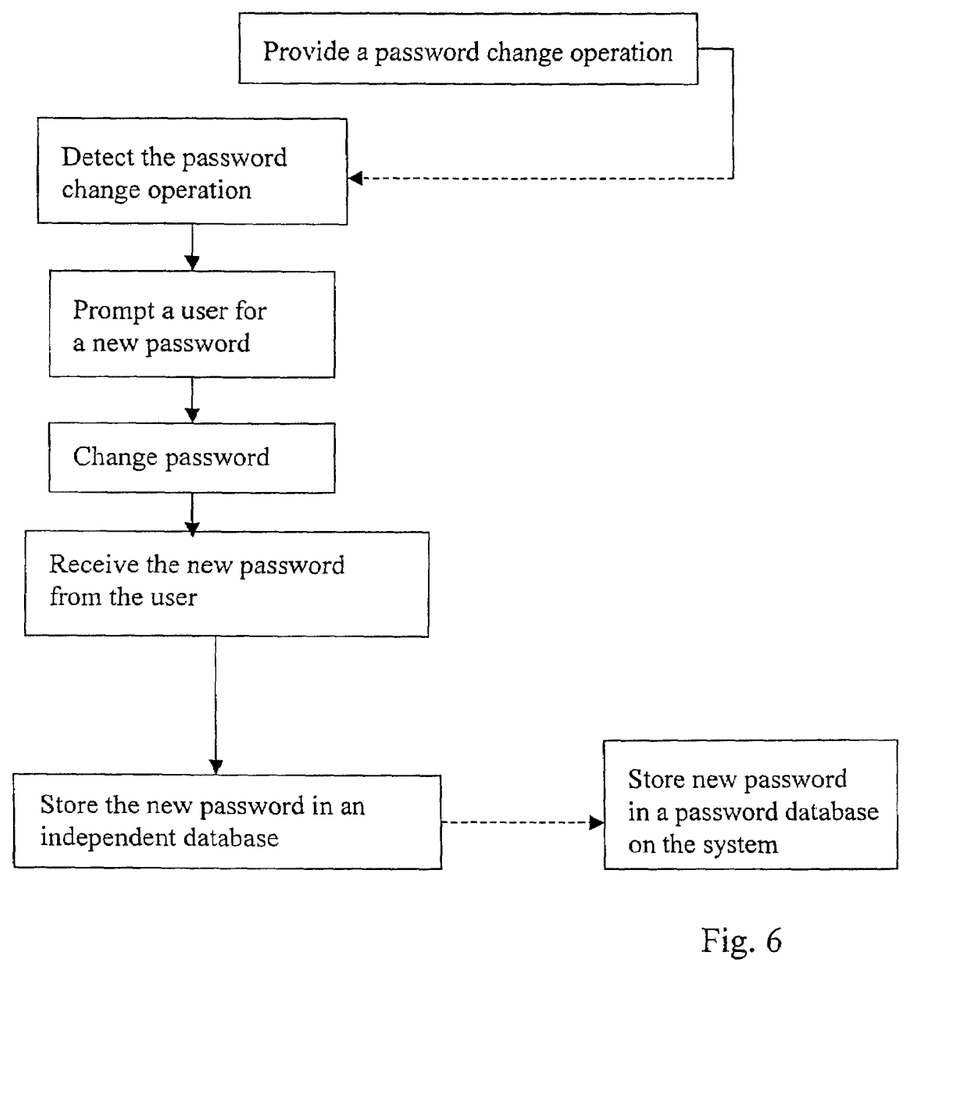
FIG. 6 is a flow diagram of a method of securely supporting password change in accordance with another preferred embodiment of the present invention.

FIG. 6 illustrates a flow diagram of a method of securely supporting password change in accordance with another preferred embodiment of the present invention is shown. Here, a password change operation is detected and a secure password change process prompts the user for a new password to allow the change password operation to proceed. The new password is provided to the process to allow changing of the password stored in an independent database. The data indicative of the new password is automatically associated with the authorization data in replacement of the data indicative of the old password. From the independent database, the new password is provided to a password database on the system to change the password there. The prompt for a new password by the secure password change process instead of by the process associated with the system or application notifies the user that the password change operation has been detected and that the new password is accurately stored.

Advantageously, the above process is implemented with no apparent change to the users of the system. In other words, a user is completely unaffected by the method of FIG. 6, since it is transparent to the user and does not affect any existing change password processes.

Figure 7:
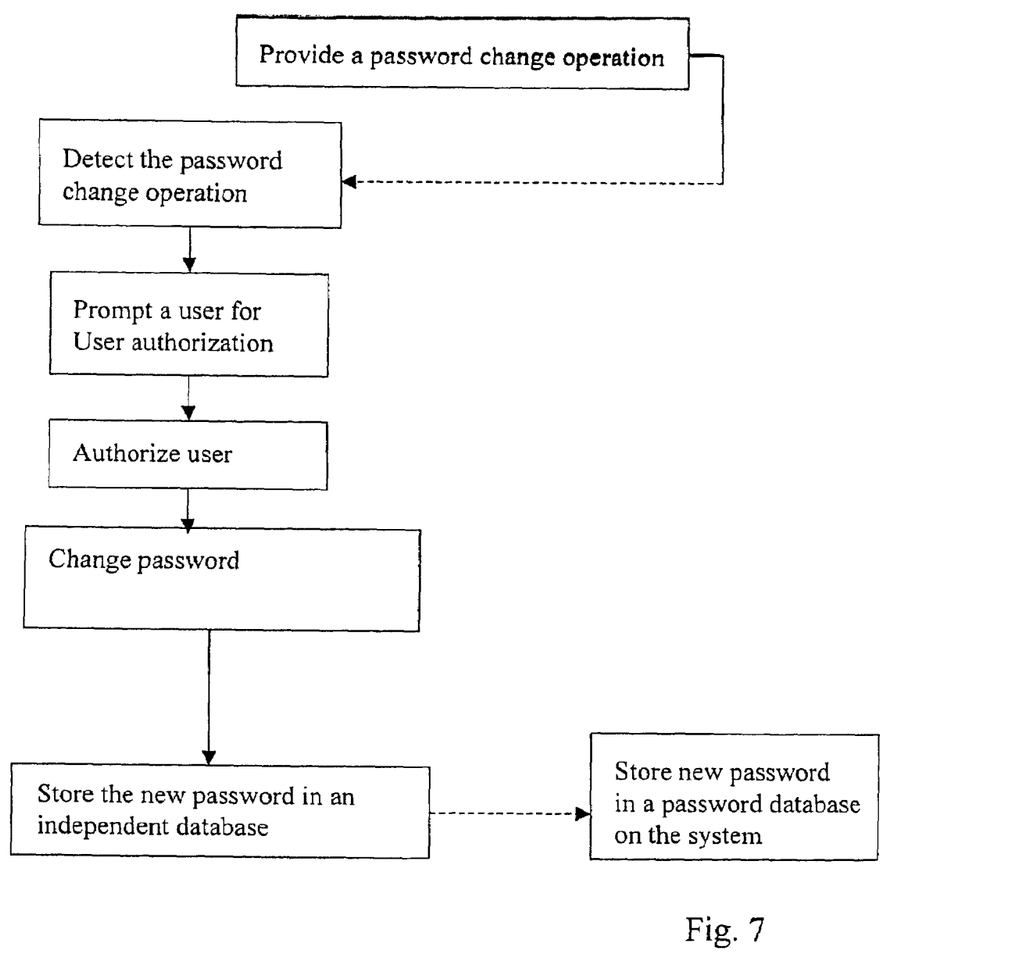
FIG. 7 is a flow diagram of a method of securely Supporting password change in accordance with another preferred embodiment of the present invention; and, FIG. 8 is a flow diagram of a method of securely Supporting password change in accordance with another preferred embodiment of the present invention wherein a choice is given to the user.

Referring now to FIG. 7, a flow diagram of a method of securely supporting password change in accordance with another preferred embodiment of the present invention is shown. Here, a password change operation is detected and a secure user authorization process prompts the user for an authorization data. Once authorized, the system allows the change password operation to proceed. The new password is provided to allow changing of the password in an independent database. The data indicative of the new password is automatically associated with the user identity in replacement of the data indicative of the old password. From the independent database, the new password is provided to a password database on the system to change the password there. The prompt for user authorization data by the secure authorization process instead of by the process associated with the system or application notifies the user that the password change operation has been detected and that the new password is accurately stored.

The above process is highly advantageous. It provides a single password change process and as such a single ergonomic interface for changing passwords. Therefore, design and implementation of the secure change password process replaces all legacy change password processes allowing for better information for the users and a more modem and ergonomic process.

Further advantageously, the above process allows for changing of passwords of several systems/files/applications simultaneously. Thus, a single change password operation is used where before several or several hundred processes would have been required. This is most applicable when changing a password used to protect a single file such as a Microsoft® Word® file or the like.

Of course, it is evident to those of skill in the art that a password entered in accordance with the above described process is optionally long and complex since there is no need to remember the password. Because of the automatic password retrieval, a user never needs to know their password so an arbitrary string of characters such as "efkjhgbshgdxfbkj#$$JHYT$kjsfd*(&REW^kvhgfd) (*^*&^%C^Tvc hbjhf86%(%(ffgf nm.b.nm.,mn.vb2609" is usable as a password allowing for greatly increased security.

Another advantage to the present method is that it allows tracking of old passwords to provide for access to older system restorations or old files that were saved using earlier passwords.

Of course, the process also supports different passwords for different systems, files and applications without substantial user inconvenience. This is achieved by storing each password in association with data indicative of the user identity or authorization and the system, file, or application with which the password is to be used. Of course, more complex associations are also possible when desired.

Figure 8:
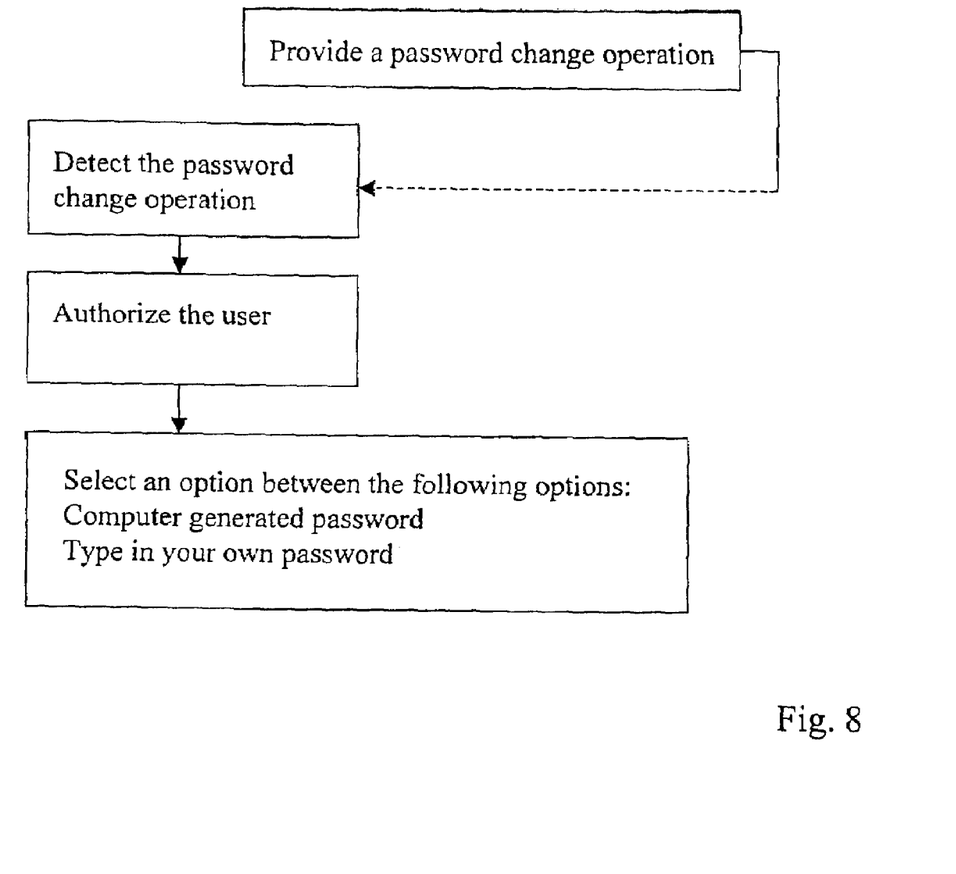

Referring now to FIG. 8, a flow diagram of a method of securely supporting password change for use with the method of FIG. 7 wherein a choice is given to the user is shown. During the password change operation and after user authorization, the user is given the opportunity to either enter a password or to have the process automatically generate a new password. Therefore, in the case of a computer-generated password, the user does not have to invent and remember the new password because it is automatically assigned to his authorization data and automatically retrieved for access to the system. Consequently, choosing a computer-generated password means that the new password is never typed in which decreases the possibilities of a Trojan Horse application from detecting same.

Advantageously, when a password is automatically generated, it is unknown to the user. This makes the password impossible to ascertain except by breaching security of password database. For example, when automatic password generation is used, an encryption key may form each password allowing for security relating to access and for encryption of file data to prevent mining of file data.

Numerous other embodiments may be envisaged without departing from the spirit and scope of the invention.

What is claimed is:

1. A password security system that securely supports password change for an associated computer network, the system comprising:

a password database configured to store passwords resulting from a password change operation;

a component configured to an occurrence of a password change operation in execution and for detecting a new password when provided; and an independent database that is independent of the password database, wherein the independent database is configured to store data indicative of the new password for later retrieval and provides data indicative of the new password to the password database for changing the password in the password database to the new password.

2. The system of claim 1 wherein the component configured to detect an occurrence of a password change operation comprises a component for detecting a new password prompt.

3. The system of claim 1, further comprising a component configured to prompt a user to provide authorization data, the authorization data being other than the new password, and for associating the authorization data with the new password.

4. The system of claim 1 wherein the component configured to detect an occurrence of a password change operation detects the new password at least two separate times.

5. A password security system that securely supports password change for an associated computer network, the system comprising:

a password database configured to store a first, old password;

means for detecting a change password operation in execution and for changing a first, old password by displaying to a user a prompt for a second, new password in response to detecting the change password operation in execution and other than occurring as an operation of the change password operation, and for receiving the new password; and a database independent of the change password operation and other than the password database, the independent database configured to store the second password in response to the change password operation and provide the second password to the password database for changing the first password to the second password.

6. The system of claim 5 wherein the means for detecting the change password operation in execution comprises means for detecting password change command options.

7. A password security system that securely supports password change for an associated computer network, the system comprising:

a password database configured to store passwords resulting from a password change operation;

means for detecting an occurrence of a password change operation in execution and for displaying to a user a prompt for authentication information in response to detecting the change password operation in execution and other than occurring as an operation of the change password operation, and for receiving the authentication information; and an independent database that is independent of the change password operation and other than the password database where a new changed password is stored by the change password operation and, when the authentication information is indicative of a known user, providing the new changed password for the known user to the password database.

8. The system of claim 7 wherein the prompt for authentication information is a prompt for biometric information.

9. The system of claim 8, further comprising a biometric system that receives biometric information from the user, processes the provided biometric information to provide biometric data, compares the biometric data with a stored template, and, in dependence upon a comparison result, retrieves a user password from the password database.

10. The system of claim 7 wherein the prompt for authentication information is a prompt for information relating to data stored in a memory of a smart card.

11. The system of claim 7 wherein the means for detecting an occurrence of a password change operation prompts the user to select between provision of the new password and automatic generation of the new password.

12. The system of claim 11 wherein the automatically generated new password is unknown to the user.

13. The system of claim 12 wherein the automatically generated new password is an encryption key.

14. The system of claim 13 wherein data secured with the new password is encrypted using the encryption key.

15. The system of claim 7, further comprising means for determining within the password database and associated with a same user all passwords identical to the password being changed and automatically performing at least another operation to change each identical password of the known user to the new password.

16. A password security system for an associated computer network, the system comprising:

a password database configured to store passwords resulting from a password change operation;

a detection component configured to detect a password change operation in execution on the network having a known user authorized thereon and for automatically generating a new password in response to detecting the password change operation and other than occurring as an operation of the change password operation; and an independent password database configured to store the new password, and automatically provide the new password to the password database to perform an operation to change a password to the new password in the network, wherein the independent password database is other than the password database.

17. The system of claim 16 wherein the automatically generated new password is unknown to the user.

18. The system of claim 17 wherein the automatically generated new password is an encryption key.

19. The system of claim 18 wherein data secured with the new password is encrypted using the encryption key.

20. The system of claim 16, further comprising a biometric authentication component operably coupled to the system and configured to authorize a known user with the network.

* * * * *